United States Patent
Henion et al.

(10) Patent No.: US 10,638,094 B2
(45) Date of Patent: Apr. 28, 2020

(54) SIDE REARVIEW VISION ASSEMBLY WITH TELESCOPING HEAD

(71) Applicant: SMR Patents S.à.r.l., Luxembourg (LU)

(72) Inventors: Paul Henion, Port Huron, MI (US); Darryl Brooks, Romeo, MI (US); Philipp Hottmann, Remshalden (DE); Gary Sinelli, Birmingham, MI (US)

(73) Assignee: SMR Patents S.á.r.l., Luxembourg (LU)

( * ) Notice: Subject to any disclaimer, the term of this patent is extended or adjusted under 35 U.S.C. 154(b) by 108 days.

(21) Appl. No.: 15/621,306

(22) Filed: Jun. 13, 2017

(65) Prior Publication Data

US 2017/0280111 A1    Sep. 28, 2017

Related U.S. Application Data

(63) Continuation-in-part of application No. 14/013,378, filed on Aug. 29, 2013, now Pat. No. 9,815,410, and
(Continued)

(51) Int. Cl.
*H04N 7/18* (2006.01)
*B60R 1/00* (2006.01)
(Continued)

(52) U.S. Cl.
CPC ............. *H04N 7/183* (2013.01); *B60R 1/00* (2013.01); *B60R 1/003* (2013.01); *B60R 1/006* (2013.01);
(Continued)

(58) Field of Classification Search
CPC ....................................................... H04N 7/183
See application file for complete search history.

(56) References Cited

U.S. PATENT DOCUMENTS 6,812,831 B2   11/2004   Ikeda
7,630,803 B2   12/2009   Stam et al.
(Continued)

FOREIGN PATENT DOCUMENTS

DE    100443099 A1    3/2002
DE    69618192 T2    7/2002
(Continued)

OTHER PUBLICATIONS

European Search Report for application No. EP 10 17 8378 dated Nov. 2, 2011; 5 pp.

*Primary Examiner* — Jamie J Atala
*Assistant Examiner* — Hesham K Abouzahra
(74) *Attorney, Agent, or Firm* — Simonelli IP, PLLC

(57) ABSTRACT

A side rearview vision assembly for a vehicle includes a base that is fixedly secured to the vehicle. A support arm is pivotally secured to the base. A positioning arm is secured to the support arm and is movable with respect to the support arm. The positioning arm defines a distal end. A camera is attached to the distal end of the positioning arm such that the camera moves with the positioning arm as the positioning arm moves relative to said support arm. The camera is configured to provide images exterior to the vehicle. A camera motor is operatively connected to the camera and changes its orientation with respect to the distal end of said positioning arm.

8 Claims, 3 Drawing Sheets

Related U.S. Application Data a continuation-in-part of application No. 14/830,406, filed on Aug. 19, 2015, now abandoned, which is a continuation of application No. 13/234,824, filed on Sep. 16, 2011, now abandoned.

(60) Provisional application No. 61/694,293, filed on Aug. 29, 2012.

(51) Int. Cl.
    *B60R 11/04*     (2006.01)
    *B60R 1/12*     (2006.01)
    *B60R 1/078*     (2006.01)

(52) U.S. Cl.
    CPC ............. *B60R 1/078* (2013.01); *B60R 1/12* (2013.01); *B60R 11/04* (2013.01); *B60R 2001/1253* (2013.01); *B60R 2300/105* (2013.01); *B60R 2300/408* (2013.01); *B60R 2300/607* (2013.01); *B60R 2300/802* (2013.01); *B60R 2300/8046* (2013.01)

(56) References Cited

U.S. PATENT DOCUMENTS

| | | |
|---|---|---|
| 8,366,318 B2 | 2/2013 | Zeller et al.ke |
| 9,129,495 B1* | 9/2015 | Stewart ............ G08B 13/19647 |
| 2003/0103142 A1* | 6/2003 | Hitomi ................... B60R 1/074 |
| | | 348/148 |
| 2004/0230358 A1 | 11/2004 | Stam et al. |
| 2004/0246608 A1* | 12/2004 | Wellington ............... B60R 1/07 |
| | | 359/877 |
| 2006/0187304 A1 | 8/2006 | Sakata |
| 2007/0127564 A1 | 6/2007 | Li |
| 2007/0263090 A1 | 11/2007 | Abe |
| 2008/0055411 A1 | 3/2008 | Lee |
| 2008/0089557 A1 | 4/2008 | Iwaki et al. |
| 2008/0116943 A1 | 5/2008 | Nair |
| 2010/0039494 A1 | 2/2010 | Horihata et al. |
| 2010/0079267 A1 | 4/2010 | Lin |
| 2010/0259371 A1 | 10/2010 | Wu et al. |
| 2011/0317049 A1 | 12/2011 | Kurane et al. |
| 2012/0062743 A1 | 3/2012 | Lynam et al. |

FOREIGN PATENT DOCUMENTS

| | | |
|---|---|---|
| DE | 69709810 T2 | 9/2002 |
| DE | 102007054342 B3 | 6/2009 |
| WO | 2006018951 A1 | 2/2006 |

\* cited by examiner

US 10,638,094 B2

SIDE REARVIEW VISION ASSEMBLY WITH TELESCOPING HEAD

This patent application is a continuation-in-part of a patent application having U.S. application Ser. No. 14/013,378 claiming priority from U.S. provisional application Ser. No. 61/694,293, filed Aug. 29, 2012, which is incorporate herein, and is also a continuation-in-part of a patent application having U.S. application Ser. No. 14/830,406, which is a continuation of application Ser. No. 13/234,824, filed Sep. 16, 2011, which is incorporated herein.

BACKGROUND ART

1. Field of the Invention

The invention relates to side rearview vision systems for motor vehicles. More particularly, the invention relates to a side rearview vision system that pivots a camera to variable orientations depending on whether the positioning arm is telescoped outwardly in an extended position, retracted inwardly to a retracted position or folded into a folded position.

2. Description of the Related Art

Certain vehicles are equipped with structures such as tow bars and the like to tow trailers, campers, boats, mobile homes, etc. Sometimes the towed vehicles are so wide that typical side view mirrors do not extend far enough from the vehicle to allow the vehicle operator to see around the towed vehicle. Accordingly, it is known to equip the towing vehicle with side view mirrors that can extend, in a telescoping manner, from a retracted position that is relatively close to the vehicle to an extended position sufficient to allow the vehicle operator to adequately see around the towed vehicle.

In certain embodiments, the towing vehicle can be equipped with cameras designed to enhance the view of the vehicle operator of hard-to-see areas around the periphery of the vehicle. In some embodiments, the cameras can be incorporated into the side view mirrors and configured to provide views of the sides of the vehicles.

SUMMARY OF THE INVENTION

A side rearview vision assembly for a vehicle includes a base that is fixedly secured to the vehicle. A support arm is pivotally secured to the base. A positioning arm is secured to the support arm and is movable with respect to the support arm. The positioning arm defines a distal end. A camera is attached to the distal end of the positioning arm such that the camera moves with the positioning arm as the positioning arm moves relative to said support arm. The camera is configured to provide images exterior to the vehicle. A camera motor is operatively connected to the camera and changes its orientation with respect to the distal end of said positioning arm.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE INVENTION

The invention will now be described with occasional reference to the specific embodiments of the invention. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

The description and Figures disclose a side rearview vision assembly having a camera mounted to a telescoping head. Generally, the camera is positioned at the end of an arm extendable away from a vehicle and pivotable with respect to the vehicle. The term "side rearview vision assembly", as used herein, is defined to mean an assembly attached to the vehicle and which permits the vehicle operator to adequately see rearward and, if present, around any towed vehicle secured to the motor vehicle.

Figure 1:
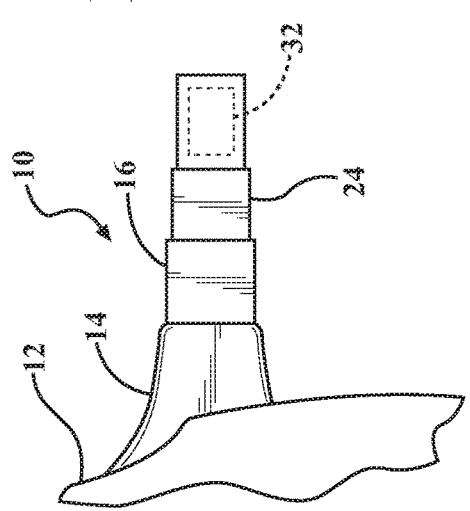
FIG. 1 is a side view of a side rearview vision assembly according to one embodiment of the invention, secured to a vehicle, partially cut away.

Referring now to FIG. 1, a side rearview vision assembly is shown generally at 10. The side rearview vision assembly 10 is configured for installation on a vehicle 12. In certain embodiments, the side rearview vision assembly 10 is configured for installation on a side door of the vehicle. However, it should be understood that in other embodiments the side rearview vision assembly 10 can be installed on other portions of the vehicle, such as for example the non-limiting examples of the frame, quarter panels or fenders. The side rearview vision assembly 10 is further configured to provide the occupants of the vehicle with a view extending to the rear of the vehicle. In certain embodiments, the side rearview vision assembly 10 can optionally be configured as a break-away design, although it should be understood that the side rearview vision assembly 10 can be practiced without a break-away design.

The side rearview vision assembly 10 includes a base or bracket 14, a support arm 16, and an image generating device 20. In the preferred embodiment, the image generating device 20 is a camera capable of generating an electronic signal of a video feed. The base 12 and support arm 16 are known in the industry and therefore will only be briefly described herein.

Figure 2:
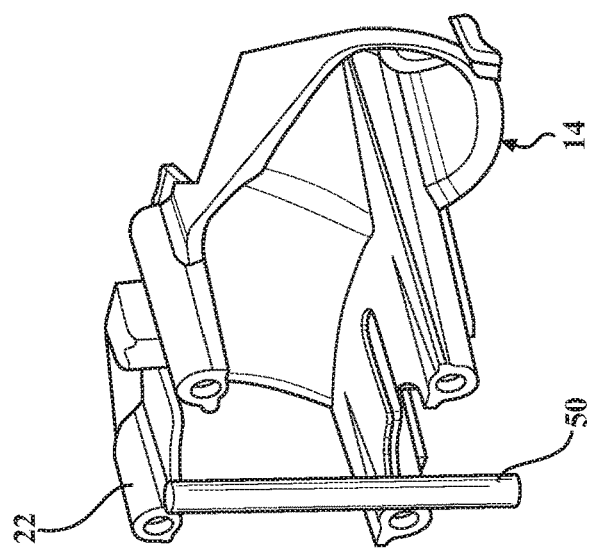
FIG. 2 is an exploded perspective view of the base and support arm of the side rearview vision assembly.
Figure 2:
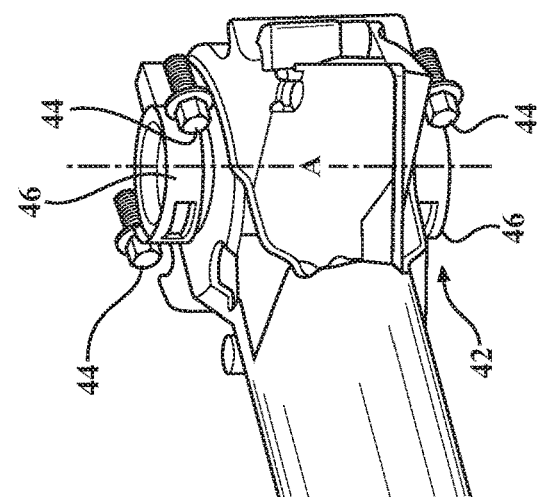

The base 14 is configured to attach the support arm 16 and the camera 20 to the vehicle 12. In the illustrated embodiment, the base 14 includes a base structure 22 (best seen in FIG. 2) and a base cover or scalp (not shown). The base structure 22 is configured to mount the support arm 16 to the vehicle 12. Any desired mechanism, device or structure, sufficient to mount the support arm 16 to the vehicle 12 can be used. Optionally, the base structure 22 can be configured such that the support arm 16 can pivot about a substantially vertical axis A-A (FIG. 2). In still other embodiments, the side rearview vision assembly 10 can be configured to pivot about an axis that is not substantially vertical.

The base cover is configured to cover the base structure 22 with an aesthetically pleasing appearance that may or may not match the color and finish of the vehicle. Any desired base cover can be used. The base cover is not shown for purposes of drawing simplification.

The support arm 16 extend from the base 14 and are configured to connect the base 14 with the camera 20. In the illustrated embodiment, the support arm 16 is hollow and has a rectangular cross-sectional shape. However, in other embodiments, the support arm 16 can have other cross-sectional shapes, such as ovular or circular cross-sectional shapes, sufficient to connect the base 14 with the camera 20. In the illustrated embodiment, the support arm 16 includes a positioning arm 24. The support arm 16 in the positioning arm 24 have internal mechanisms and devices configured to retract the camera 20 to a retracted position and extend the camera 20 to an extended position. The camera 20 is fixedly secured to a distal end 26 of the positioning arm 24. The positioning arm 24 moves within the support arm 16. Mechanisms and devices for telescoping the camera 20 relative to the base 14 and vehicle 12 are well known in the art and need not be described in detail herein, (see, e.g. U.S. Pat. No. 7,748,857 to Belcher, et al. and assigned to SMR Patents S.à.r.l.). While the embodiment shown in FIG. 1 illustrates a single support arm 16, it should be appreciated that in other embodiments a quantity of two or more support arms can be used.

A housing 30 covers and protects the camera 20. The housing 30 may be of any desired shape and includes various outer walls that merge together in a smooth manner such as to present a pleasing appearance. A substantially rearward facing portion of the housing 30 is open and forms a cavity 32. The cavity 32 is configured to receive the camera 20. A suitable shaped support member (not shown) is secured within the housing 30 and serves to movably support the camera 20 within the cavity 32. Mechanisms used to control the position and orientation of the camera 20 within the housing 30 will be discussed in greater detail subsequently.

In the illustrated embodiment, the camera 20 is of the type to provide real-time digital images. However, in other embodiments, the camera 20 can provide other types of images. Optionally, the images from the camera 20 can be digitally combined with other images from other cameras to provide the vehicle occupants with a virtual "around-the-vehicle" view. While not shown in the Figures, power and image conducting cables extend from the camera 20. In certain embodiments, the power and image conducting cables can be ducted through the support arm 16 and the positioning arm 24 to controls (not shown) located within the interior of the vehicle.

Referring to FIG. 2, the support arm 16 has a motor assembly 42 secured therein. The motor assembly 42 is mounted into the base 14 using bolts 44 holding U-shaped attachments straps 46 against projections 48 in the base 14. A detent bar 50 is urged outwardly by springs (not shown) forcing the detent bar 50 away from the base 14. The detent bar 50 provides a stop when the support arm 16 is rotated. The detent bar 50 also provides a load to prevent forward break-away. The motor assembly 42 provides for the pivoting of the support arm 16 between a retracted position and an outward position (the outward position is shown in FIG. 2). When the support arm 16 is in the retracted position, the support arm 16 extends along the vehicle 12 generally parallel thereto. When the support arm 16 is in the outward position, the support arm 16 extends generally perpendicularly to the side of the vehicle 12.

Figure 3A:
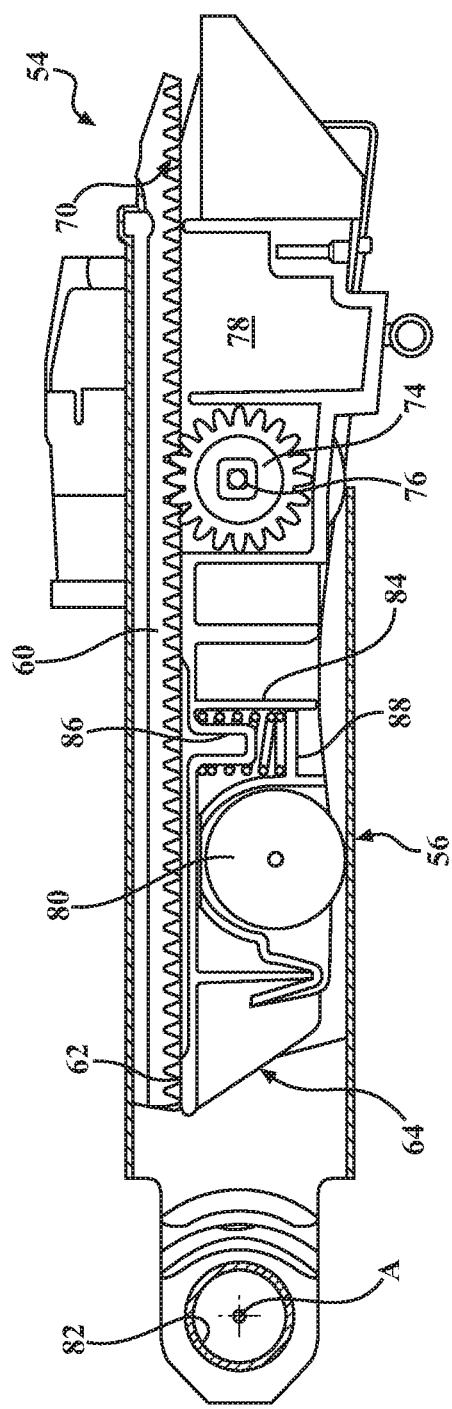
FIG. 3a is a partially cut away top view of the side rearview vision assembly of FIG. 1 illustrating the camera a retracted position.
Figure 3B:
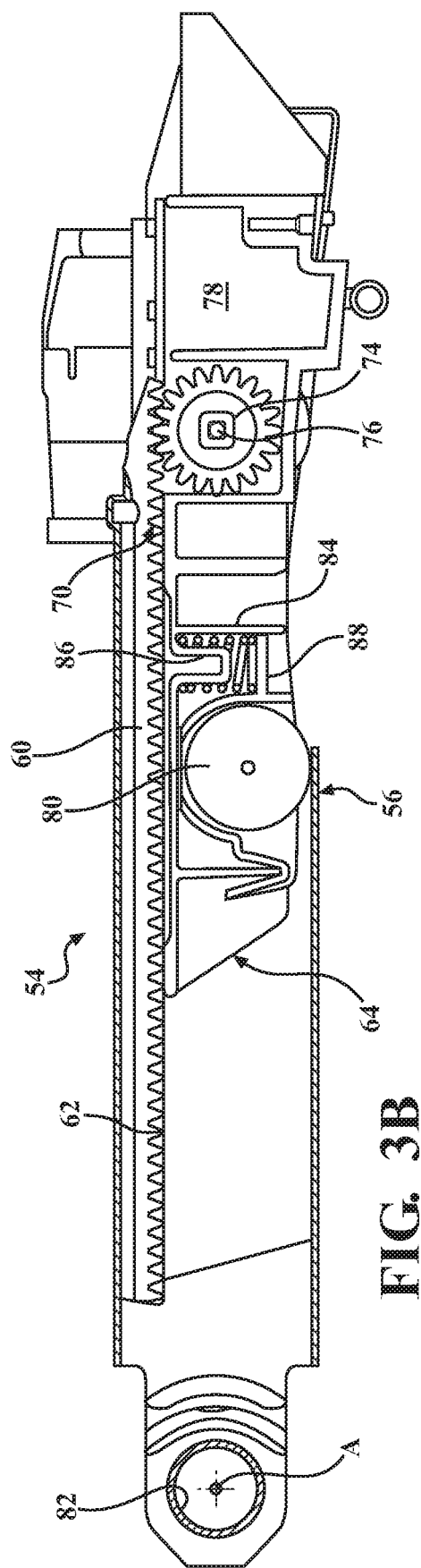
FIG. 3b is a partially cut away top view of the side rearview vision assembly of FIG. 1 illustrating the camera in an extended position.

Referring to FIGS. 3a and 3b, the support arm 16 include a front portion 54 and a rear portion 56. The front portion 54 includes a rack 60. The positioning arm 24 also includes a front portion 62 and a rear portion 64. On the front portion 62 of the positioning arm 24 is an inboard contact surface 66 and an outboard contact surface 70, with the contact surfaces 66, 70 engaging rails (not shown) to guide the positioning arm 24 in a telescoping relationship with the support arm 16.

A pinion 74 is secured to the positioning arm 24 by a pin 76. The pinion 74 is powered by a motor, which is housed within a cavity 78 of the positioning arm 24. The motor drives the pinion 74 in a traditional manner. When the pinion 74 rotates, it engages the rack 60 to translate the rotational motion of the motor in the cavity 78 into lateral motion of the positioning arm 24. A wheel 80 is mounted to the positioning arm 24 and assists in the telescoping movement of the positioning arm 24 with respect to the support arm 16 due to its ability to ride along the rear portion 56 of the support arm 16. A spring 84 extends between a boss 86 and a positioning arm abutment surface 88 to ensure the pinion 74 engages the rack 60.

The support arm 16 includes a folding axis defined by a pivot hole 82. With reference back to FIG. 2, the side rearview vision assembly 10 folds along the axis defined by the pivot hole 82 and telescopes by having the positioning arm 24 relative to the support arm 16 and a coaxial manner.

Figure 4A:
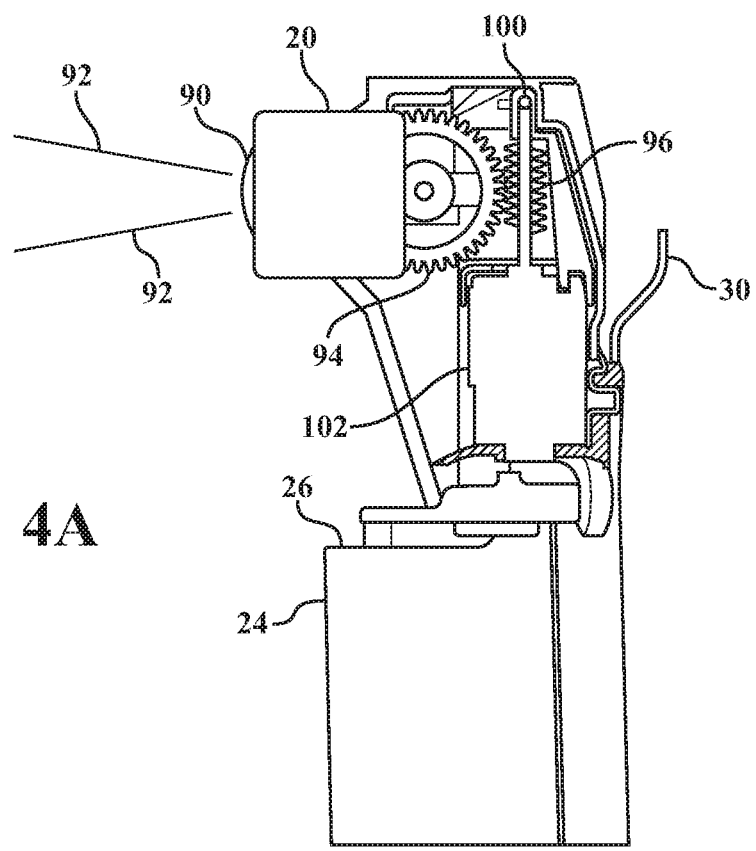
FIGS. 4a and 4b are partially cut away top views of the side rearview vision assembly in unfolded and folded positions, respectively.
Figure 4B:
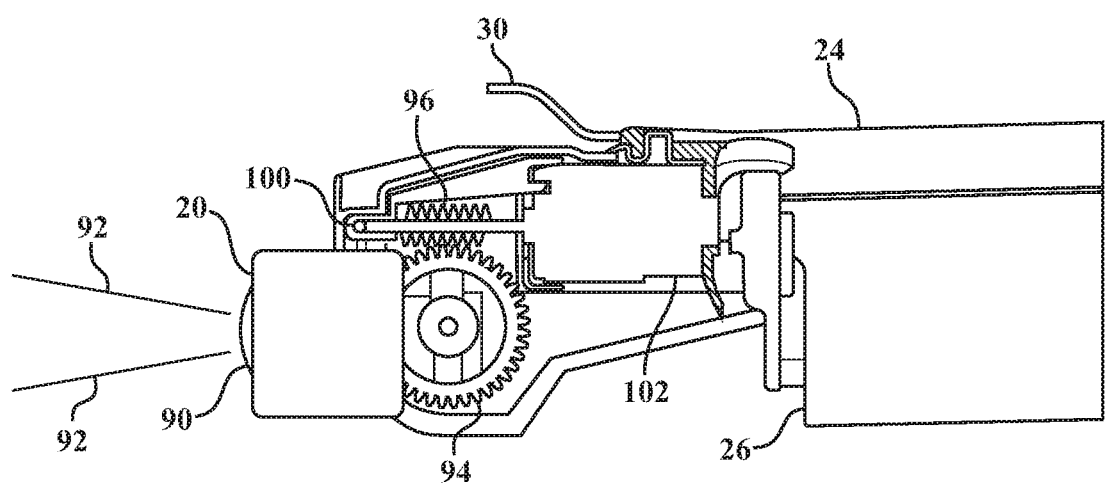

Referring to FIGS. 4a and 4b, the camera 20 is shown at the distal end 26 of the positioning arm 24. For purposes of clarity, the housing 30 for the camera 20 is shown cutaway in these Figures. The camera 20 is shown to include a lens 90. The lens 90 provides a field-of-view, graphically represented by lines 92 in a manner to depict generally a field-of-view, but not representing an actual angle or range of angles through which the field-of-view extends. Although the lens 90 is shown to extend beyond the camera 20, it should be appreciated by those skilled in the art that the lens may be encased within the body of the camera 20.

The camera 20 is pivotally secured to the distal end 26 of the positioning arm 24. The camera 20 is pivoted by a camera gear 94, which is driven by a worm gear 96. The worm gear 96 is fixedly secured to a driveshaft 100 that is driven by a camera motor 102. More specifically, the camera motor 102 is secured to the distal end 26 of the positioning arm 24 and is operatively connected to the camera 20. The camera motor 102 changes the orientation of the camera 20 with respect to the distal ends 26 to change the field-of-view 92 of the camera 20 with respect to the vehicle 12.

Referring specifically to FIG. 4a, the camera 20 is oriented by the camera gear 94 such that its field of view 92 extends perpendicular to the positioning arm 24. This is a typical orientation for the camera 20 as the field-of-view 92 in this instance is generally parallel to the side of the vehicle 12 and facing the rearward of the vehicle 12. In such an orientation, the side rearview vision assembly 10 will be able to capture images rearward and to the side of the vehicle 12. In the situation where the positioning arm 24 is fully extended out from the support arm 16, the camera 20 will be able to capture images that are further out from the vehicle 12. This will benefit the driver of the vehicle 12 when the vehicle 12 is towing an object that is longer or wider than what the camera 20 is designed to capture when the positioning arm 24 is retracted into the support arm 16, which is the normal operational position of the side rearview vision assembly 10.

Referring specifically to FIG. 4b, the camera 20 is oriented by the camera gear 94 such that the field-of-view 92 extends parallel to the positioning arm 24 and parallel to the support arm 16. In some embodiments, the field-of-view 92 may even be coaxial with the support arm 16. As with the situation shown in FIG. 4a, the field-of-view 92 is generally parallel to the side of the vehicle 12. Unlike the situation shown in FIG. 4a, the camera 20 is operating even though the support arm 16 and the positioning arm 24 have been moved to the folded position by the motor assembly 42 that prohibits the support arm 16 about an axis defined by the pivot hole 82. The operation of the camera 20 when it is disposed immediately adjacent the vehicle 12 due to the folding of the support arm 16 about the pivot hole 82 is independent of whether the positioning arm 24 is retracted into the support arm 16 or whether the positioning arm 24 is telescoped out away from the support arm 16.

In addition, the orientations of the camera 20 as shown in FIGS. 4a and 4b are the two extreme orientations of the camera 20. The camera 20 may operate in other orientations with respect to the side of the vehicle 12 or the orientation of the positioning arm 24. In other words, the camera 20 may be oriented such that the field-of-view 92 extends out and away from the side of the vehicle 12. This may be done by a driver of the vehicle 12 when towing an extremely wide load. The orientation of the camera 20 may also be modified if the support arm 16 is in a position other than the fully extended position or the fully folded position.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

We claim:

1. A side rearview vision assembly for a vehicle comprising:
a base fixedly secured to the vehicle;
a support arm pivotally secured to said base, said support arm pivotal between retracted and extended positions;
a positioning arm secured to said support arm and movable with respect to said support arm, said positioning arm defining a distal end;
an image generating device comprising at least one camera attached to said distal end of said positioning arm such that said at least one camera moves with said positioning arm as said positioning arm moves relative to said support arm, said at least one camera configured to provide images exterior to the vehicle through a defined field of view; and
a camera motor operatively connected to said at least one camera to change orientation of said at least one camera based on the position and orientation of said distal end of said positioning arm with respect to the vehicle, such that the defined field of view of said at least one camera remains independent of the position and orientation of said distal end of said positioning arm.

2. A side rearview vision assembly as set forth in claim 1 wherein said camera motor is secured to said distal end of said positioning arm.

3. A side rearview vision assembly as set forth in claim 2 including a camera gear fixedly secured to said camera.

4. A side rearview vision assembly as set forth in claim 3 wherein said camera motor includes a shaft having a worm gear fixedly secured thereto extending out from said camera motor for providing rotational motion.

5. A side rearview vision assembly as set forth in claim 4 wherein said worm gear engages said camera gear.

6. A side rearview vision assembly as set forth in claim 5 wherein said camera is oriented by said camera motor independently of said position of said support arm.

7. A side rearview assembly as set forth in claim 6 wherein said positioning arm telescopes with respect to said support arm.

8. A side rearview vision assembly for a vehicle comprising:
a base fixedly secured to the vehicle;
a support arm secured to said base;
a positioning arm secured to said support arm and moves telescopically with respect to said support arm, said positioning arm defining a distal end having a position and an orientation; and
a camera attached to said distal end of said positioning arm such that said camera moves with said positioning arm as said positioning arm moves relative to said support arm and the vehicle, such that said camera remains independent of the position and orientation of said distal end of said positioning arm.

* * * * *